Dec. 19, 1961 W. C. BOYD 3,013,806
SPHERICAL VEHICULAR AMUSEMENT DEVICE
Filed June 23, 1960 2 Sheets-Sheet 1

INVENTOR
William C. Boyd

BY Clive H. Brawson
ATTORNEY

Dec. 19, 1961  W. C. BOYD  3,013,806
SPHERICAL VEHICULAR AMUSEMENT DEVICE
Filed June 23, 1960  2 Sheets-Sheet 2

INVENTOR
William C. Boyd

BY Clive H. Branson

ATTORNEY

United States Patent Office 3,013,806
Patented Dec. 19, 1961

3,013,806
SPHERICAL VEHICULAR AMUSEMENT DEVICE
William C. Boyd, 5921 Dillon Ave., McLean, Va.
Filed June 23, 1960, Ser. No. 38,250
8 Claims. (Cl. 280—78)

This invention is concerned broadly with amusement devices and more particularly with a novel spherical vehicular device employed as a carrier for human beings.

Vehicular devices heretofore devised and utilized for the purpose of transportation and/or amusement are known to consist basically of familiar, expected and obvious structural configurations notwithstanding the myriad of vehicle designs encompassed by the crowded prior art and developed for the fulfillment of countless requirements.

The vehicular device according to the present invention, however, radically departs from the conventional, and in so doing provides an apparatus primarily developed for purposes of amusement, the design and principle thereof being orientated to and in phase with contemporary and future space-age concepts.

One of the general objects of the instant invention, therefore, is to provide a vehicular amusement device which will impute to the passenger thereof, a feeling of containment within a space vehicle, said feeling being generated in view of the overall appearance of the device and further in view of the suspended gimballed attitude experienced by the said passenger.

A more specific object of the present invention is the provision of a vehicle of spherical configuration whereby an occupant thereof, while seated or positioned within the sphere, may propel said sphere in any direction, said sphere having infinite axes of rotation.

A still further object of the present invention is to provide a vehicle whereby the passenger thereof is permitted to retain a position substantially normal to the surface being traversed, notwithstanding his complete envelopment within a revolving sphere which is engaged in rolling motion upon a stationary or moving surface.

Another object of this invention is to provide a spherical amusement device wherein a passenger, being supported within said device, and independent of the rotational motion thereof, may impart selective directional locomotion to the device while remaining gimballed vertically therein.

A further object of the present invention is to provide a spherical amusement device adapted to accommodate one or more passengers, motion of the device being occasioned either and/or by inclined stationary or moving topography or by rotation imparted by the occupant or occupants to the sphere.

An additional object of the instant invention is to provide a spherical amusement device adapted to accommodate one or more passengers, wherein motion of the device may be initiated, guided and/or arrested by the occupant or occupants from within said sphere.

Another object of the instant invention resides in the provision of means for effectuating closure of the spherical vehicular device about a passenger, such closure being easily accomplished by said passenger in a minimum period of time.

Still another object of this invention is to provide a quick release mechanism permitting instant separation of passenger and spherical apparatus in the event such rapid separation becomes desirable.

With the foregoing and various other objects and features in view, which will be readily apparent from the following description and explanation, the instant invention consists in certain novel features in design, construction, and combination of elements, all which will be more fully and particularly referred to and described hereinbelow following.

Referring to the accompanying drawings in which similar reference characters refer to corresponding parts and elements throughout the several figures, FIGURE 1 is a front elevational sectional view of an assembled spherical vehicular device constructed in accordance with and embodying the invention;

Figure 1:
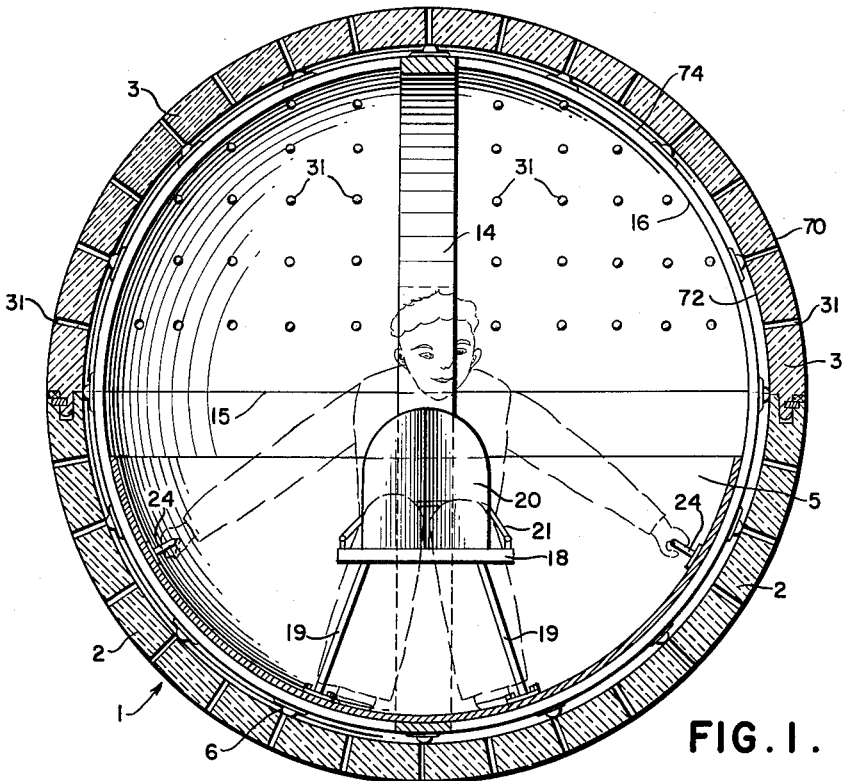

As thus illustrated, the spherical vehicular device is designated in its entirety by reference character 1. Essentially, the apparatus according to this invention is comprised of an inner shell and an outer shell, said inner shell being designated generally by numeral 4, and said outer shell being composed of upper hemispherical shell 3 and lower hemispherical shell 2, said shells 2 and 3 being removably connected in edge abutting relation at 15 thereby forming an entirely spherical container as illustrated in FIGURE 1 of the drawings.

Figure 2:
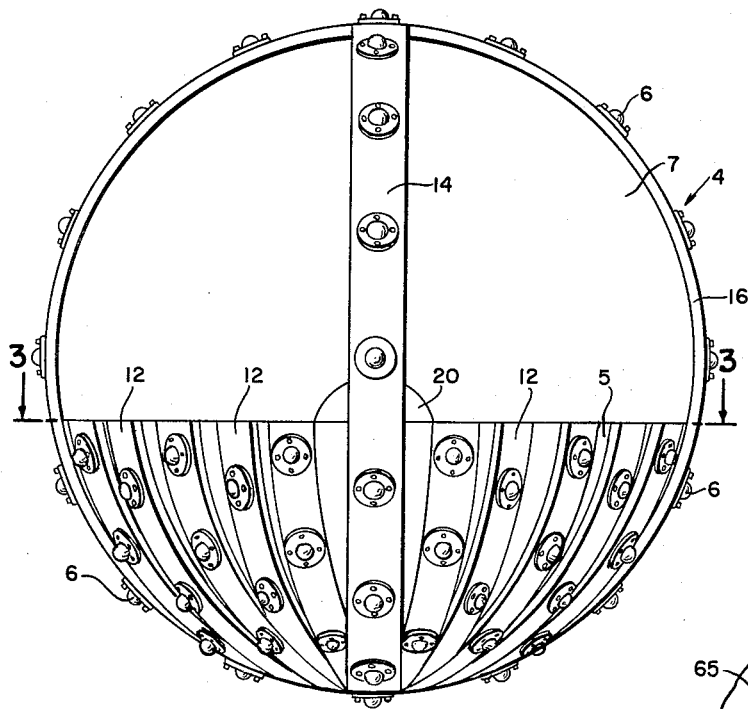
FIGURE 2 is a front elevational perspective view of the inside gimballed shell.

Inner cradle assembly 4, perspectively shown in FIGURE 2 is seen to consist of lower shell portion 5 which is cradled within arcuate supporting members 12 and further enveloped by circumferentially extending bulwark members 14 and 16. It is further observed that said supporting members and said bulwark members provide supporting frame-like surfaces for a plurality of open-type ball bearings 6, the outermost tangential extremities of said bearings taken collectively, generating a uniform spherical locus of points having a radius of curvature larger than that formed by said supporting and said bulwark members, but substantially equal to the inside diameter of the aforedescribed outer sphere.

Lower shell portion 5 is proportioned to encompass approximately one-third the area of said inner cradle frame assembly 4, and is provided with essentially most of the open-type ball-bearing elements 6 inasmuch as the entire passenger load is required to be supported thereby. Seat 18 supported by legs 19 and having back-rest 20 is adapted to receive a passenger as illustrated in FIGURE 1 of the drawings, seat belt 21 furnishing secure restraint for the passenger while hand grip elements 24 provide further support therefor.

Figure 4:
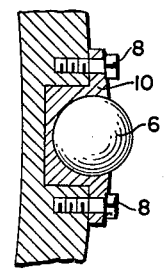
FIGURE 4 is a sectional view of one of a plurality of open-type ball bearings shown in position in FIGURE 2.

Bearings 6, illustrated in detail in FIGURE 4 of the drawings are preferably of a material of softer qualities than the material embodied in the construction of the outer shell members. This is especially important in the case where the said outer shell members are fabricated of transparent plastic materials which would normally be susceptible to marring occasioned by roller bearings of greater relative hardness. In the aforementioned FIGURE 4, bearings 6 are shown journalled within race 10, the combination of bearing and race being countersunk and fastened within a supporting surface by bolt members 8.

The materials of construction utilized in forming outer shell members 2 and 3 are preferably selected from those classes of synthetic resins falling within the fiberglass reinforced polyester compounds or within the transparent methacrylate polymers although it is intended that materials for fabrication shall neither be limited to these synthetic compounds in particular nor to synthetic compounds in general but to the contrary may be of any suitable materials applicable to construction of a device of the present nature.

Where transparent materials are employed in the construction of outer sphere components 2 and 3, apertures 31 provided therein function primarily as instruments of ventilation. The diameters thereof may be small and consequently do not establish pit-falls in the paths of roller bearings 6 which are positioned upon supporting members 12 and bulwark members 14 as aforedescribed and shown in FIGURE 2 of the drawings. Therefore, a plurality of apertures of e.g., one-eighth inch diameter, dispersed throughout the spherical surface satisfy the need for ventilation, visibility being clear and unobstructed through the transparency of the surface material.

In the event, however, opaque rather than transparent materials are deemed preferable for specific applications, ventilation apertures 31 must assume the additional function of providing visibility. Accordingly, in order to function as a plurality of window areas, apertures 31 must be larger in diameter, e.g., approximately one-half inch and be positioned with at least the frequency as in the case of the transparent outer spherical surface. It will be readily observed that an increase in the diameter of apertures 31 must necessarily be accompanied by a proportionate increase in the diameter of roller bearings 6 and as further compensation, an increase in the number of bearings contained upon the outer surface of lower shell portion 5 being similarly expedient, said bearings being arranged in a manner such that a majority thereof will continually be free of registry with a majority of apertures, thereby providing a continually unobstructed riding surface for said peripherally supported roller bearings. Assurance of providing an adequate unobstructed riding surface is achieved by the employment of a staggered bearing matrix as shown in FIGURE 2 of the drawings.

Seat 18, comprised of back-support 20, legs 19 and seatbelt brackets 26 is removably positioned centrally of lower cradle portion 5, hand grips 24 being provided as a stabilizing factor further abetting the safety of the passenger. While the seat illustrated in the drawing is dimensionally suitable to the accommodation of one passenger, it will be understood that the provision of a plural passenger seat is within the contemplation of the present invention.

As heretofore discussed, rotational motion may be imparted to the outer spherical surface, said surface being integrally comprised of hemispherical shells 2 and 3. Such motion may obviously be engendered by gravity acting upon the sphere freely positioned on the slope of an inclined plane. Movement of the supporting planar surface would similarly impart rotation to the peripheral sphere of the instant apparatus. Accordingly, it can be seen that any force, suitably acting upon the outer spherical surface of the device will impart rotational motion thereto.

Of further import, however, the instant spherical vehicular device features passenger controlled locomotion inclusive of initiation, guidance and arrest thereof. To that end, open area 7 comprising approximately two-thirds the surface area of inner shell assembly 4 provides access to concave inner surface 72 of the said outer sphere. That is, through hand manipulations exerted against said concave inner surface 72, the passenger may direct his travel notwithstanding his complete isolation within the instant apparatus.

Additionally significant in the manifestation of the invention is the removable character of entire seat assembly 18. Once removed from the central portion of cradle 5, the passenger, no longer being restricted to a seated position, may occupy any convenient position directly within said cradle and upon the inside padded surface thereof. One position, found especially favorable in the purposeful fulfillment of the spherical apparatus consists in the occupant lying upon his back, his legs being alternately directed against the inner concave surface of the said outer sphere in log-rolling fashion. Guidance of the rolling device may thusly be effectuated in a manner similar to the aforedescribed hand control manipulation.

To enable access within the instant apparatus, partial disassembly thereof need first be accomplished. Referring to FIGURE 1 of the drawings, butt line 15 reveals the connecting region between outer hemispherical shell members 2 and 3, FIGURES 5, 6 and 7 indicating in detail the elements of the closure embodiment preferred. Basically, a dual dowel-socket arrangement is employed to join respective edges 36 and 44 of the respective hemispherical shell members, sliding ring 32 being utilized to either hold or release said edges in or from edge abutting relation. While a complete disclosure of the aforesaid closure assembly appears hereinbelow following, it will suffice at present to realize that removal of one hemispherical shell is occasioned with facility by virtue of the sliding ring embodiment passenger entry to within cradle 5 being readily accessible thereafter.

Dowels 40 and 28, intermittently spaced along peripheral edge 36 of hemispheric shell 3 are guided to register within similarly intermittently respectively spaced sockets 42 and 30 disposed along peripheral edge 44 of hemispheric shell 2. Sliding ring 32 is housed within lower hemispheric shell 2 directly beneath the surface of peripheral edge 44. Therein, ring 32 is adapted to slide within groove 21 provided therefor, the movement of said ring being instrumental in fixing dowel 28 within socket 30 or in releasing said dowel therefrom. Further discussion relative to the operation of the sliding ring, the details of construction thereof and its relation to dowel 28 in particular, require reference to FIGURES 5–11 of the drawings, inclusive.

Figure 5:
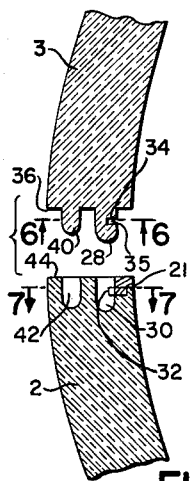
FIGURE 5 is a cross-sectional expanded elevation view of a sliding-ring quick release closure element and dowel peripheral support element.
Figure 6:
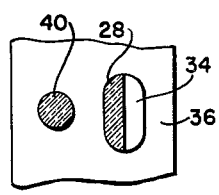
FIGURE 6 is a plan view of the sliding-ring and support elements illustrated in FIGURE 5 and taken along line 6—6 of FIGURE 5.
Figure 7:
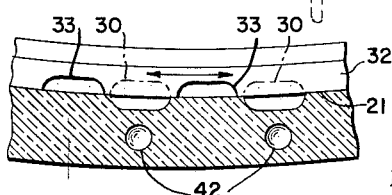
FIGURE 7 is a plan view of the sliding-ring closure embodiment of the instant invention taken along line 7—7 of FIGURE 5.

FIGURE 6, a cross sectional view taken along line 6—6 in FIGURE 5, illustrates the oval configuration of dowel 28. The complementary oval configuration of sockets 30 is indicated in FIGURE 7 wherein the intermittent spacing of said sockets is also shown. Sliding ring 32 observable in said FIGURE 7, is seen to be comprised of oval notches or detents 33 cut from an edge of said sliding ring, said edge being in sliding relation with groove 35 within said dowel 28. Inasmuch as said notches are similarly configured but slightly larger than ovally shaped dowels 28, it becomes apparent that alignment of notches 33 with dowels 28 will permit reception and removal of said dowels from within their respective sockets thereby enabling assembly and disassembly of entire hemispheric shells 3 and 2. Movement of said sliding ring out of alignment, however will preclude separation of said hemispheric shells.

Figure 8:
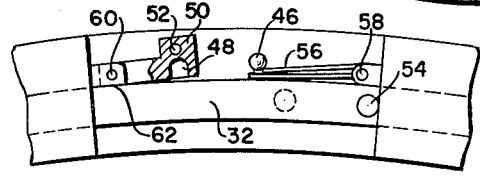
FIGURE 8 is a plan view of the quick-release mechanism adapted to the sliding-ring closure embodiment illustrated in detail in FIGURES 5 and 6.
Figure 9:
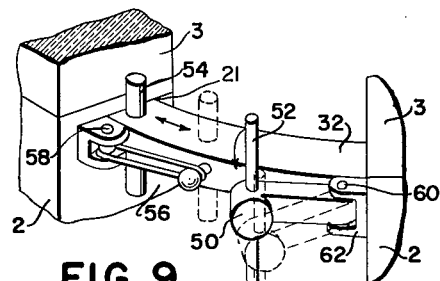
FIGURE 9 is a perspective view of said sliding-ring quick-release mechanism.
Figure 11:
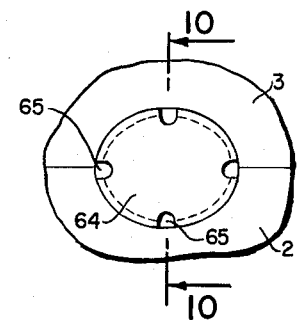
FIGURE 11 is a plan view of the access port to the quick-release mechanism.
Figure 3:
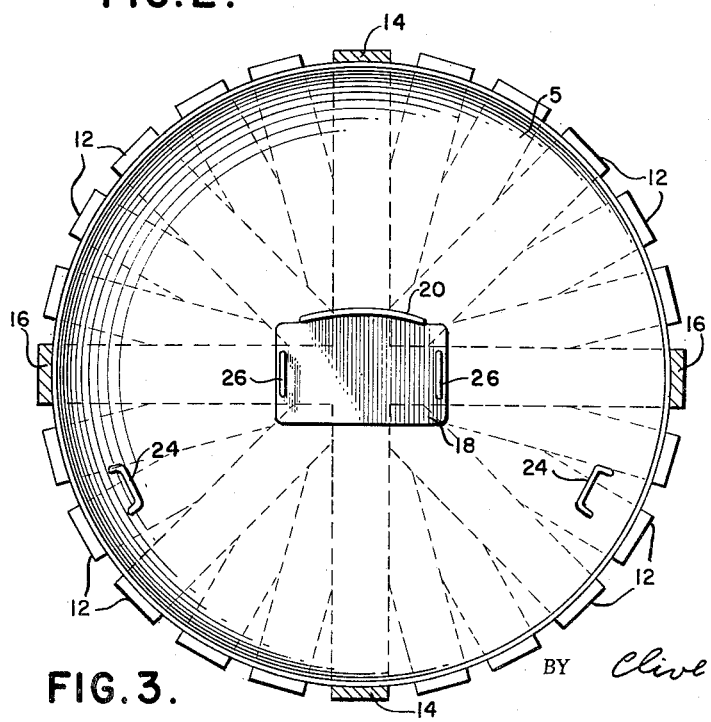
FIGURE 3 is a plan view of the inside gimballed shell taken along line 3—3 of FIGURE 2.
Figure 10:
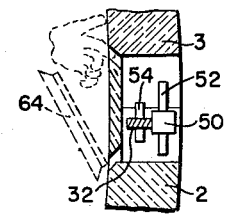
FIGURE 10 is a vertical sectional view taken along line 10—10 of FIGURE 11 and showing the said access port in placed and removed position.

FIGURES 8 and 9 of the drawings illustrate a preferred embodiment of a semi-automatic sliding ring moving device and FIGURES 10 and 11 illustrate the housing therefor positioned along butt line 15. Access port cover 64, placed as shown in the drawing, obviates the existence of a cavity condition otherwise interfering with unobstruction of bearings 6 riding upon inner concave surface of the outside sphere of the instant apparatus. Structurally, the said semi-automatic sliding ring moving device is comprised of well 48 recessed within in restrainer cap 50, said cap being adapted to envelop dog 46 which is integral with sliding ring 32 thereby restraining sliding ring 32 against movement in the direction of bias created by the spring loaded action of resilient element 56. Restraining cap member 50 is pivotally connected through pin 60 to protrusion 62 of hemispheric shell 2 adjacent the outside edge of sliding ring 32. Lifting of rod 52 which forms an integral part of restrainer cap 50 will raise said restrainer cap from dog 46, thus freeing sliding ring 32 for movement in its biased direction. As previously disclosed, notches 33 intermittently spaced along the outside edge of sliding ring 32 are arranged to permit registry between dowels 28, female socket members 30 and said notches 33. According to the semi-automatic quick release mechanism of this invention, registry of the aforesaid members is achieved in the event sliding ring 32 is urged to a position defined by stop-bar 54 being in contiguity with the end wall of the cavity as shown in FIGURES 8 and 9. Registry being accomplished, hemispherical shell 3 can easily be lifted away from hemispherical shell 2, freeing the passenger therein from encasement for purposes of egress from the present invention. Access to the semi-automatic quick release mechanism is available from within or without the spherical vehicular device as can be seen in FIGURE 10 of the drawings.

It is to be realized that construction of the inner cradle and outer shell members of the invention need not be limited insofar as the number of components comprising each member is concerned. That is, various modifications may be made, as for example, the outer sphere may be further sectionalized without departing from the spirit of the invention as recited in the appended claims.

What is claimed is:

1. A spherical vehicular device comprising in combination, an outer spherical member having an inner and outer surface, an inner cradle member having an inner and outer surface, the outer surface of said cradle member having a plurality of open-type ball bearings mounted thereon, said cradle being adapted for rotation within said outer spherical member along infinite axes of rotation with respect to the center of said outer spherical member, and means whereby at least one human being can enter said spherical vehicular device and assume a position within the cradle member thereof.

2. A spherical vehicular device comprising in combination, an outer spherical member having an inner and an outer surface, said spherical member being composed of a pair of hemispheric shell members arranged in edge abutting relation, the edge of one of said hemispheric shell members containing a plurality of spaced, groove containing dowels protruding therefrom, the edge of the other of said hemispheric shell members containing a plurality of spaced socket members arranged for registry with said dowels, said edge of the other of said hemispheric shell members having a peripheral channel furrowed beneath the surface thereof, a circular ring adapted to slide within said channel, said circular ring containing a plurality of spaced notches adapted for registry with said dowels and said socket members, said circular ring being substantially the thickness of said grooves contained in said dowels and slidably received thereby; a cradle member disposed within said outer spherical member, said cradle member being adapted for rotation within said outer spherical member.

3. A spherical vehicular device according to claim 1 wherein movement of said circular ring through a predetermined arcuate distance is effectuated by triggering a spring loaded mechanism.

4. A spherical vehicular device according to claim 3, wherein said spring loaded mechanism is housed beneath a removable port cover.

5. A spherical vehicular device comprising in combination, an outer spherical member having an inner and outer surface, an inner cradle comprised of a lower shell portion and bulwark members extending circumferentially thereabout, and a plurality of open-type ball bearings mounted upon the outer surfaces of said inner cradle thereby adapting said inner cradle for rotation against the inner surface of the outer spherical member about infinite axes of rotation with respect to the center of said outer spherical member.

6. A spherical vehicular device comprising in combination, an outer spherical member having an inner and outer surface, an inner cradle comprised of a lower shell portion and bulwark members extending circumferentially thereabout, a plurality of arcuate supporting members superposed upon said lower shell portion, and a plurality of open-type ball bearings mounted upon the outer surfaces of said inner cradle thereby adapting said inner cradle for rotation against the inner surface of the outer spherical member about infinite axes of rotation with respect to the center of said outer spherical member.

7. A spherical vehicular device comprising in combination, an outer spherical shell member, said spherical shell member being composed of a pair of hemispheric shell members arranged in edge abutting relation, the edge of one of said shell members containing spaced dowels protruding therefrom, the edge of the other of said shell members containing spaced sockets adapted to receive said dowels in a respective and complementary manner, means adapted to removably secure said dowels within said respective sockets, and a cradle member disposed within said outer spherical shell member, said cradle member being adapted for rotation within said outer spherical member.

8. A spherical vehicular device comprising in combination, an outer spherical member having an inner and outer surface, a cradle comprised of a lower shell portion, and bulwark members extending circumferentially thereabout, a plurality of open-type ball bearings mounted upon the outer surfaces of said cradle thereby adapting said cradle for rotation against the inner surface of the outer spherical member about infinite axes of rotation with respect to the center of said outer spherical member; a plurality of apertures positioned throughout the surface of said outer spherical member; a seat within the lower shell portion of said cradle member, and gripping members positioned adjacent said seat.

References Cited in the file of this patent

UNITED STATES PATENTS

| | | |
|---|---|---|
| 1,265,496 | Pare | May 7, 1918 |
| 2,267,254 | Reilley | Dec. 23, 1941 |